UNITED STATES PATENT OFFICE.

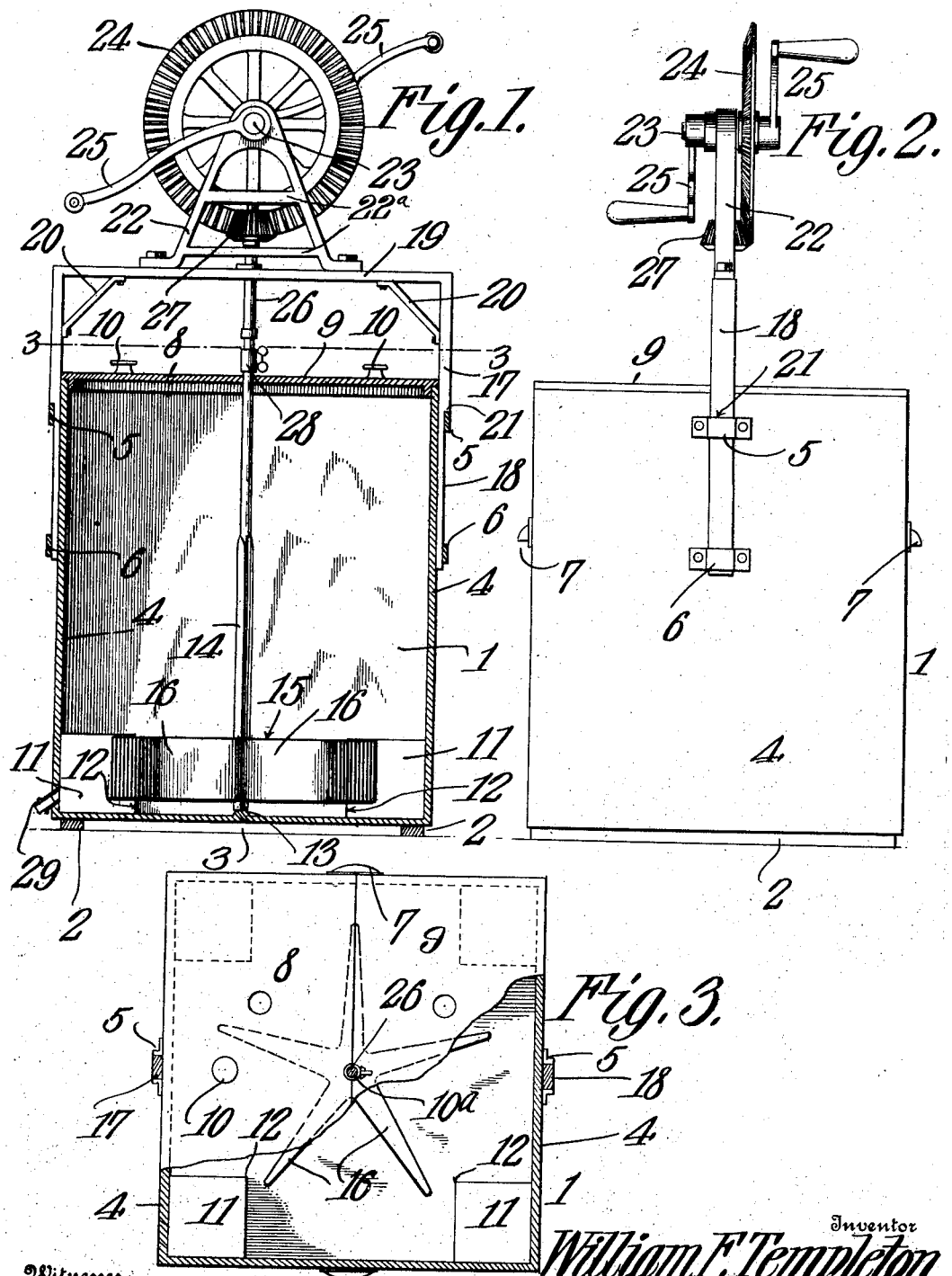

WILLIAM F. TEMPLETON, OF BIGCUT, VIRGINIA.

CHURN.

No. 896,482.  Specification of Letters Patent.  Patented Aug. 18, 1908.

Application filed December 18, 1907. Serial No. 407,035.

*To all whom it may concern:*

Be it known that I, WILLIAM F. TEMPLETON, a citizen of the United States, residing at Bigcut, in the county of Scott and State of Virginia, have invented a new and useful Churn, of which the following is a specification.

This invention relates to churns; and has for its principal object to provide a simple and efficient apparatus for quickly and thoroughly separating the butter particles from cream and causing or permitting them to unite and form granules. This result is accomplished by the use of a beater having a plurality of radial arms, rotatable in a suitable receptacle provided with means for coöperating with the beater arms to thoroughly agitate the cream contained in the receptacle.

A further object of the invention relates to the frame carrying the rotating mechanism and the means for removably attaching said frame to the receptacle, whereby its removal therefrom is rendered easy and unobstructed access obtained to the interior of the receptacle.

With these and other objects in view, the invention consists of the construction, combination and arrangement of parts hereinafter described and definitely claimed, reference being had to the accompanying drawing, in which Figure 1 is an elevation of the improved churn, the receptacle being shown in vertical section; Fig. 2 is an elevation viewed at a right angle to Fig. 1, and Fig. 3 is a top plan view of the cream receptacle, the closure being partly broken away and the frame supporting the operating mechanism removed above the line 3—3 of Fig. 1.

Similar reference numerals are used for the same parts in all the figures.

A receptacle 1 preferably square in plan view and of suitable height is provided to contain the cream to be churned. Parallel bars or sill pieces 2, 2 are fastened to the bottom of the receptacle near opposite sides to raise the churn above the ground, while between the sills 2, 2 is another bar 3 extending across the bottom of the receptacle at the center to serve as a strengthening rib. The sides of the receptacle 1 are vertically disposed, two of said sides numbered 4, and opposite each other, have fastened on their outer surfaces loops 5 and 6 in the vertical center of the sides, the loops 5 being above the loops 6. Handles 7 by which the churn may be lifted are fastened to the other two sides of the receptacle 1. The open top of the receptacle is closed by a cover made of two like parts 8 and 9, each part having a lifting knob 10 and a notch which notches register when the cover is in place and form the central opening 10ª.

Secured to the bottom of the receptacle and in each corner thereof are cream breakers, consisting in this instance each of a cubical block 11, so disposed that one of its vertical corners or edges 12 projects towards the center of the churn.

Fastened to the bottom of the receptacle 1 in the center thereof is a step bearing 13 for the lower end of a vertical spindle 14 on which the rotating beater 15 is fastened just above said step bearing. The upper end of the spindle passes through the opening 10ª in the cover. The beater is made with a central body or hub from which radiate a plurality of arms 16, preferably five in number, and of such length that their ends pass close to the corners 12 of the blocks 11 and dash the cream against the sides and corners of said blocks, the effect of which is to cause the microscopic globules of butter to rapidly separate from the watery part of the cream and unite to form small lumps or granules. The top of the beater 15 and the upper surfaces of the blocks 11 are substantially in the same plane and may extend a greater or lesser distance above the bottom of the receptacle as circumstances or experience dictate.

The numerals 17 and 18 designate two vertically disposed standards connected at their upper ends by a horizontal bar 19 strengthened by corner braces 20, the whole forming a supporting frame for the beater rotating mechanism. The standards 17 and 18 have their lower ends slightly reduced in thickness, forming a shoulder 21 on each, which reduced portions are slipped through the loops 5 and 6 when the frame is attached to the churn, and hold said frame rigidly but removably connected to the receptacle. The shoulders 21 rest on the loops 5 and determine the lowermost position of the frame.

Bolted to the top of the frame at the center of the bar 19 is an upright bracket 22, at the top of which is journaled a short shaft 23 carrying a large bevel gear wheel 24 and a hand crank 25 at each end, the angular distance between said cranks being one-hundred and eighty degrees. Journaled in the bars 22ª of the bracket 22 is a short vertical shaft 26 on which is secured a bevel pinion 27 meshing with the bevel gear wheel 24. The lower end of said vertical shaft 26 is provided with an adjustable coupling 28 of any suitable type to fasten it axially to the spindle 14 of the beater for rotating the same.

The operation of the churn is obvious and further description thereof is unnecessary. After churning, the coupling 28 is disconnected and the frame with the operating mechanism removed. The lids 8 and 9 are then lifted off the receptacle and the beater taken out, thus giving free access to the butter within the receptacle. The buttermilk may be withdrawn through a thimble 29 at the bottom of the receptacle, closed by an ordinary cork stopper.

It is to be understood that while it is preferred to make the cream receptacle square, other regular polygonal forms may be used if so desired, and the number of beater arms may also be changed to obtain the best results from an alteration in the form of the receptacle.

I claim:

A churn comprising a receptacle of polygonal form the inner angles of which are provided each with a fixed block having two flat unbroken vertical sides meeting to form a continuous vertical edge or corner projecting away from the inner angle of the receptacle towards its center, a central spindle carrying a beater from which radiate arms reaching nearly to the edges of said blocks the upper surfaces of which and of the beater lie in the same plane, a removable frame fitted to the upper end of said receptacle, a spindle rotating mechanism attached to said frame, and a separable coupling means between the spindle and its rotating mechanism.

In testimony that I claim the foregoing as my own, I have hereto affixed my signature in the presence of two witnesses.

WILLIAM F. TEMPLETON.

Witnesses:
   THOMAS J. ALLEY,
   I. E. WILLIAMS.